United States Patent [19]
Jeffery

[11] 3,873,058
[45] Mar. 25, 1975

[54] MOULDING APPARATUS

[75] Inventor: Robin Douglas Jeffery, Columbia, Md.

[73] Assignee: Stelmo Limited, Ashford, Kent, Great Britain

[22] Filed: Mar. 27, 1973

[21] Appl. No.: 345,410

[30] Foreign Application Priority Data
Mar. 28, 1972 United Kingdom............... 14570/72

[52] U.S. Cl................................. 249/161, 249/131
[51] Int. Cl............................................. B41b 11/56
[58] Field of Search .......... 249/129, 131, 160, 161, 249/162, 163, 119, 120; 425/62, 63

[56] References Cited
UNITED STATES PATENTS

| | | | |
|---|---|---|---|
| 3,220,692 | 11/1965 | Eklund | 249/161 |
| 3,411,567 | 11/1968 | Sieger | 249/162 X |
| 3,471,910 | 10/1969 | Slavin | 249/163 X |
| 3,659,977 | 5/1972 | Haws | 425/63 X |
| 3,701,508 | 10/1972 | Cross | 249/129 |
| 3,744,184 | 7/1973 | Niemi | 249/129 X |
| 3,758,067 | 9/1973 | Kleiber | 249/129 |

FOREIGN PATENTS OR APPLICATIONS 1,213,141  11/1970  United Kingdom................ 249/119

Primary Examiner—Francis S. Husar
Assistant Examiner—John S. Brown
Attorney, Agent, or Firm—Browne, Beveridge, DeGrandi & Kline

[57] ABSTRACT

The specification discloses moulding apparatus comprising a frame, a plurality of upstanding mould wall members mounted on the frame, the wall members all being movable between a moulding position in which the wall members are positioned parallel to one another and to an end wall on the frame, with spaces between them to form mould cavities between adjacent wall members and being movable singly from the moulding position in a direction away from the end wall so as to open the mould cavities to allow removal of a moulded product formed in each cavity and at least two hydraulic ram devices, which, in the moulding position, are mounted on the frame one being arranged to act at or near the top, and the other at or near the bottom of the wall member furthest from the end member to urge the wall members together in the closed position, the hydraulic ram devices being readily disengageable from the frame to allow the wall members to move away from the moulding position, wherein a supporting member on which each wall member is movably mounted for movement towards and away from a moulding position extends along the upper part of the moulding apparatus, and there is provided a carriage mounted for movement along the length of the supporting member, the carriage having means for selectively lifting a mould wall member, and power drive means for the carriage whereby a mould wall member may be moved towards and away from the moulding position.

6 Claims, 7 Drawing Figures

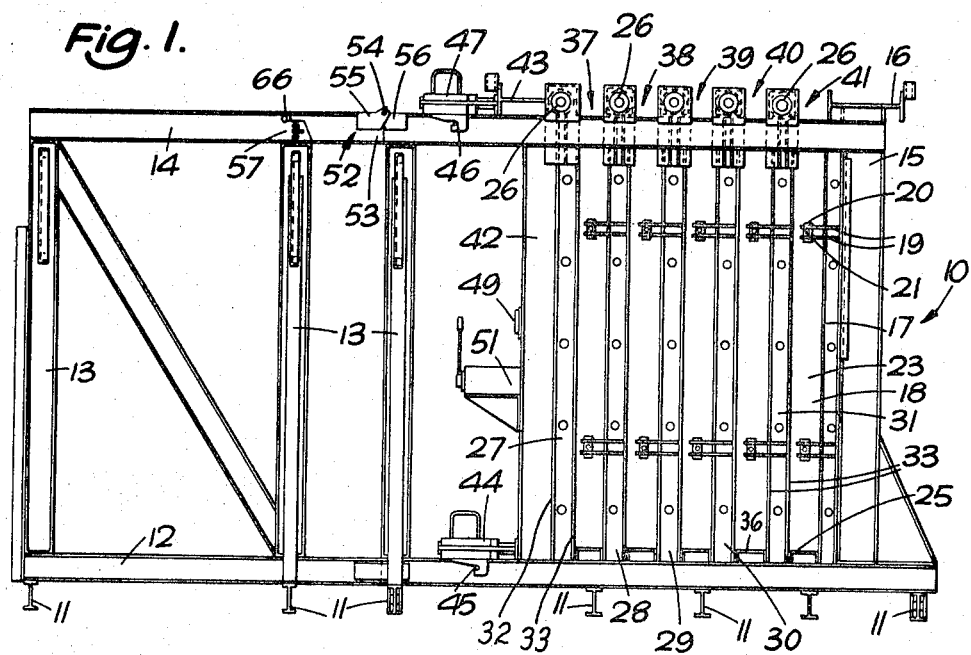
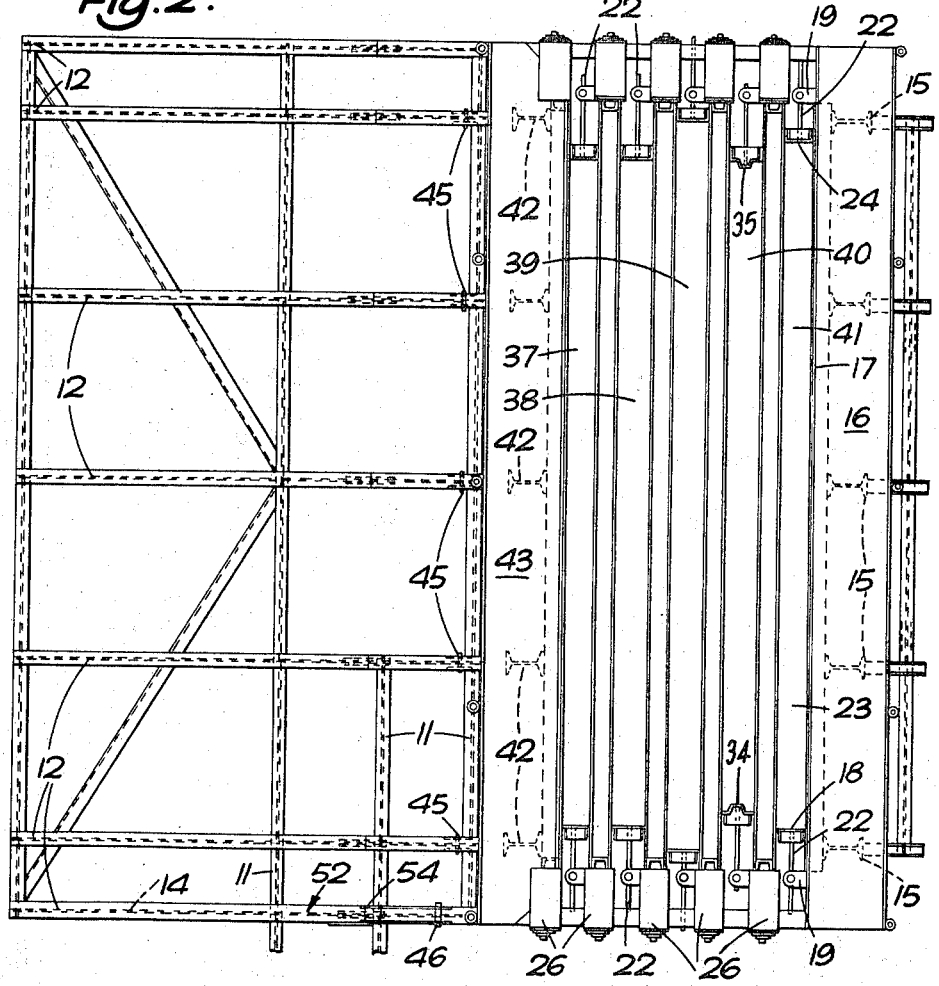

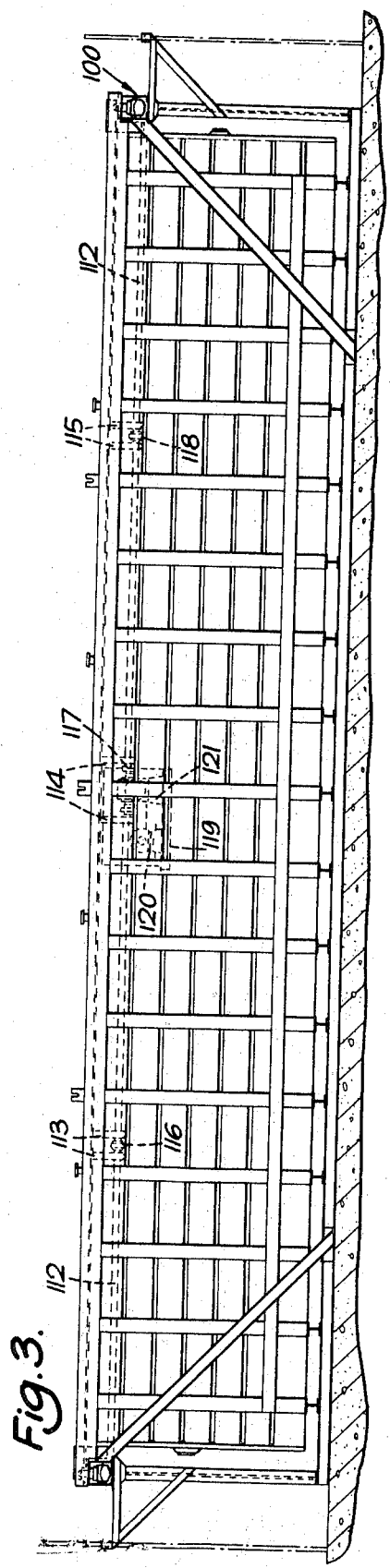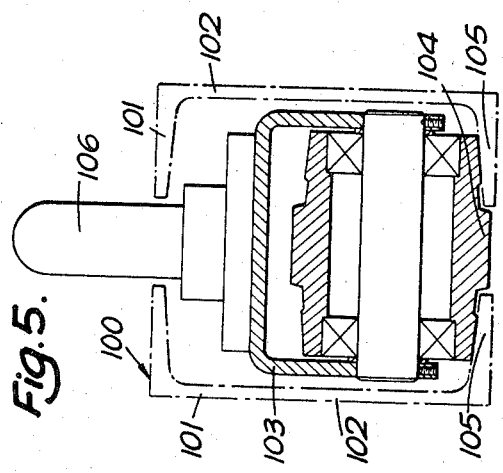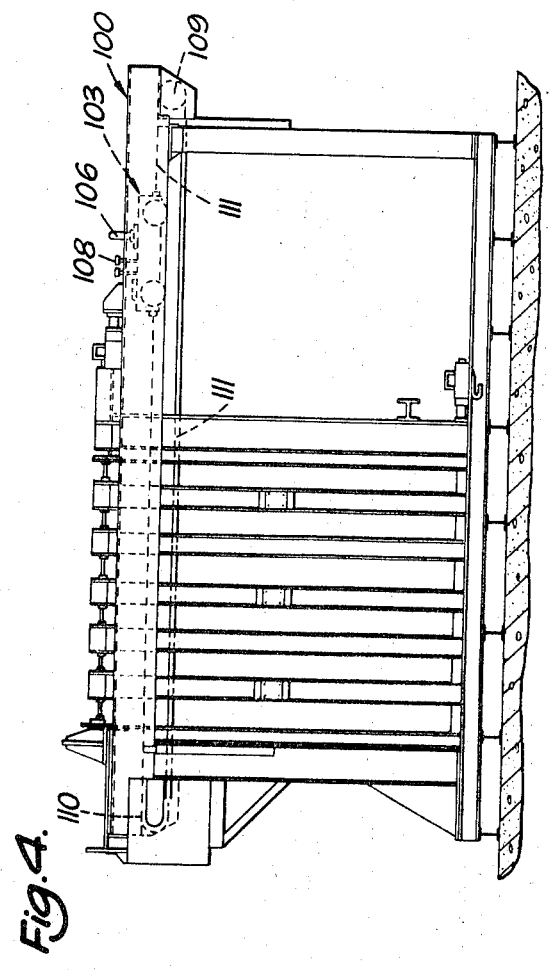

MOULDING APPARATUS

BACKGROUND OF THE INVENTION

The invention relates to moulding apparatus comprising a frame, a plurality of upstanding mould wall members mounted on the frame, the wall members all being movable between a moulding position in which the wall members are positioned parallel to one another and to an end wall on the frame, with spaces between them to form mould cavities between adjacent wall members and being movable singly from the moulding position in a direction away from the end wall so as to open the mould cavities to allow removal of a moulded product formed in each cavity and at least two hydraulic ram devices, which, in the moulding position, are mounted on the frame one being arranged to act at or near the top, and the other at or near the bottom of the wall member furthest from the end member to urge the wall members together in the closed position, the hydraulic ram devices being readily disengageable from the frame to allow the wall members to move away from the moulding position.

Manually operated apparatus of this type has worked adequately for vertical battery moulds of a limited size, usually casting walls of a normal room height and a maximum of 25 feet long. However, when large sizes are required, for example concrete walls up to 12 feet high and 60 feet span manual operation becomes impractical. The object of the invention is to provide a moulding apparatus which can handle the greatly increased size of panels involved.

SUMMARY OF THE INVENTION

The invention provides in moulding apparatus of the type described above the improvement wherein a supporting member on which each wall member is movably mounted for movement towards and away from a moulding position extends along the upper part of the moulding apparatus, and there is provided a carriage mounted for movement along the length of the supporting member, the carriage having means for selectively lifting a mould wall member, and power drive means for the carriage whereby a mould wall member may be moved towards and away from the moulding position.

Two supporting members may be provided, one extending along each side of the apparatus respectively, there being two carriages, one to each supporting member respectively.

The power drive means for the carriage may comprise a chain the ends of which are linked by the carriage, the chain passing around sprockets located one at or adjacent each end of the supporting member.

In the apparatus in which two supporting members are provided, the two sprockets at or adjacent at least one of the ends of the two supporting members respectively may be interconnected by shafting, there being drive means arranged to rotate the shafting.

In the last described arrangement the drive means may be drivingly connected to the shafting at substantially the mid-point of the shafting between the sprockets.

The supporting member may comprise a pair of channel members connected together with the channels facing one another and the base webs disposed in a generally vertical plane.

In the last described arrangement, the carriage may have a pair of rollers rotatably mounted thereon, each roller being shaped for engagement with the lowermost side flange of each of the two channel members of the associated supporting member.

The lifting means may comprise a hydraulic jack mounted on a respective carriage, the jack being engageable with a part of the mould wall.

BRIEF DESCRIPTION OF DRAWINGS

FIG. 1 is a side view of a moulding apparatus utilized in the invention;

FIG. 2 is a plan view of the apparatus of FIG. 1;

FIG. 3 is an end view of a moulding apparatus constructed in accordance with the invention;

FIG. 4 is a side view of the apparatus of FIG. 3;

FIG. 5 is a detailed view on an enlarged scale of part of FIG. 3;

DESCRIPTION

Figure 6:
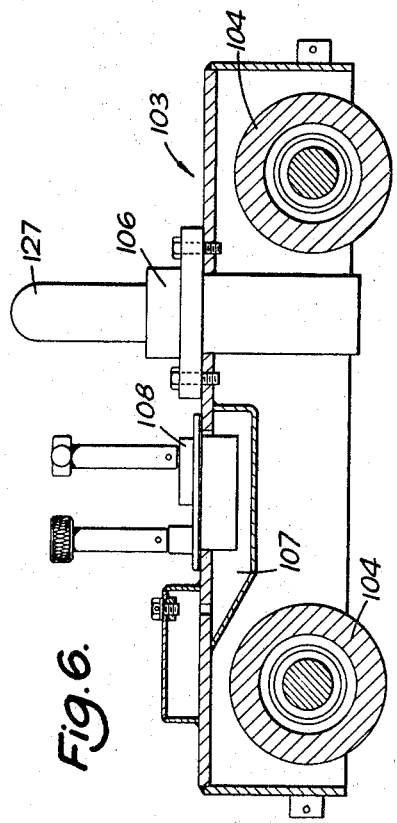
FIG. 6 is a detailed view on an enlarged scale of a carriage.

The moulding apparatus utilized in the invention is shown in FIGS. 1 and 2. The moulding apparatus is for use in moulding five concrete panels simultaneously. The mould frame 10 comprises eight I-section girders 11 forming a base on top of which are attached seven I-section girders 12 at right angles to the girders 11.

To the outer two of each of these girders 12 are attached three vertical girders 13 and to the top of each of these two groups of girders 13 are attached an extended support member in the form of a horizontal rail or girder 14. At the same end of each of the other girders 12 is attached a vertical I-section section girder 15 each of which is attached at its upper end to a girder 16 which is also attached to the rails 14. An end device comprising a vertical rectangular plate 17 is attached to the framework of girders 15 and 16, the plate 17 extending between, but ending short of, the outer two girders 12 and also the girders 11 and rail 14. The plate 17 forms one side of a mould cavity 41. Attached to one vertical edge of the plate 17 and extending towards the opposite end of the mould frame are two support members 19, which adjustably support side plates 18 and 24. Bolted to the bottom of plate 17 is a soffit 25 which together with the two side plates 18 and 24 form three sides of a mould 41.

Rollers 26 run on each of the rails 14. A wall member comprising a shutter 27 is attached to two rollers 26, one roller running on one rail 14, the other roller running on the other rail 14. Further shutters 28, 29, 30 and 31 are similarly attached to their associated pairs of rollers 26. The rollers 26 are each eccentrically mounted on an associated shaft, the shaft being rotatable to raise and lower the roller out of and into engagement with the rail 14.

The shutters 27-31 each comprise a front panel 32 and a rear panel 33. These panels 32 and 33 are similar in size and shape to plate 17. The shutter 31 may be moved on its two rollers 26 so that its rear panel 33 abuts the soffit 25 and side plates 18 and 24 of the plate 17. Thus a complete mould 41 is formed from the plate 17, said plates 18 and 24, soffit 25 and plate 33 of shutter 31. The top of the mould 41 is not covered.

Two side plates 34 and 35 and a soffit 36 are attached to the shutter 31 in a similar way as the side plates 18 and 24 and soffit 25 are attached to plate 17. Shutters 27, 28, 29 and 30 which are similar to shutter 31 have side plates and soffits connected in a similar way. The last shutter 27, however, does not have any side plates or soffits.

Attached to the front panel 32 of shutter 27 are five supporting girders 42 which extend between the top and bottom of shutter 27 and which are situated above each girder 12 in the base of the frame. A girder 43 extends across the top of the shutter 27 between the pair of rollers 26 which carry this shutter.

When all of the shutters 27–31 are moved to the right hand end of the frame as shown in FIG. 1 five hydraulic rams 44 may be hooked over pins 45 in the five girders 12 which are below the girders 42. The rams 44 may bear against the girders 12. Similarly there is a pin 46 (only one of which is shown) in each of the two rails 14 over each of which an hydraulic ram 47 may be hooked to bear against each end of girder 43 of shutter 27. The pistons of each of ram 44 and 47 is threaded and on each piston there is a loose nut (not shown). By applying hydraulic pressure to the rams 44 and 47 the shutters 27–31 may be forced into tight abutment with each other on the plate 17 forming five mould cavities 37–41.

One of the two rails 14 contains a bridging member comprising a gate 52 which consists of a section 53 of the rail cut out and hinged at the end closest to plate 17 on a hinge 54 which passes through plates 55 attached to the section 53 and through plates 56 attached to the rail 14. The hinge 54 which extends above the rail 14 in two parts on either side of the rail 14 so that the rollers 26 may roll along the rail between the two parts. The hinge 54 is positioned so that the section 53 may rotate from its normal position in which the rail 14 is continuous to a position in which the section lies along the top of the rail. A guide 66 is provided on the part of the rail 14 furthest from plate 17 so as to align the section 53 with the rail 14 when the gate 52 is in its normal, closed, position. When the gate is open a gap is created in the rail 14. Two of the girders 13 are attached to the rail 14 at either side of this gap.

Attached to the rail at the end of the section 53 remote from the hinge 54, is a pin 57 which, when the section 53 is lifted away from its closed position the pin 57 moves up so as to prevent any shutters 27–31 which may be positioned to the left (as seen in FIG. 1) of the gate 52 from rolling into the gap located in the rail.

Figure 7:
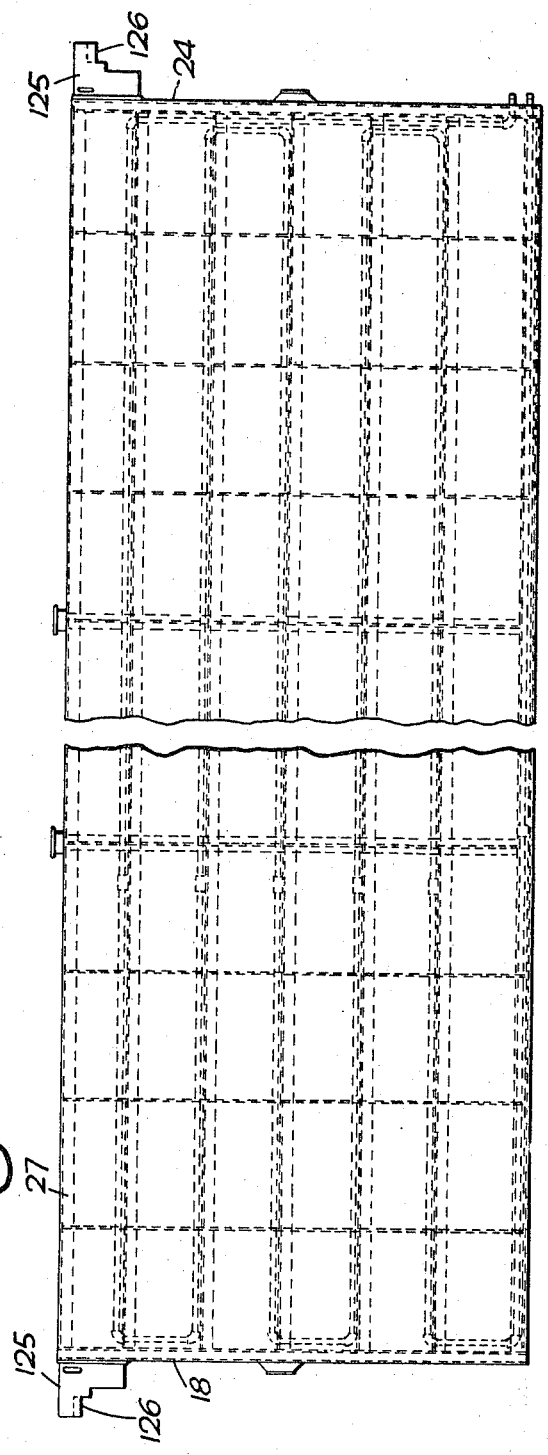
FIG. 7 is an end view of a shutter.

In the following, parts common to the just-described apparatus and that of FIGS. 3 to 7 will be given common reference numerals.

The improvement in or modification of the apparatus described above comprises replacing the rails 14 by two supporting members 100, each supporting member comprising a pair of channel members 101 held in an opposed relationship, with the channel of each member facing one another, and the webs 102 vertical. The supporting members 100 thus extend one along the upper part on each side of the apparatus respectively.

A carriage 103 is mounted on each supporting member, and comprises a generally box-shaped structure having two rollers 104 rotatably mounted on ball races therein. The rollers 104 are shaped for engaging the two lower flanges 105 of each channel member 101 of the associated supporting member.

Each carriage has a hydraulic jack 106 attached thereto for vertical lifting movement, there being a reservoir 107 for hydraulic fluid and a manually operated pump 108 also provided in the respective carriage.

Power drive means are provided for the carriages, and, for each carriage 103, comprises a pair of sprockets 109, 110, located one adjacent each end of the associated supporting member 100. A chain 111 passes around the sprockets 109, 110, the ends of the chain 111 being linked by the carriage 103. The spockets 110 associated with the two carriages are connected together by means of shafting 112, supported in pairs of brackets 113, 114, and 115. The shafting 112 is in four sections, joined co-axially by means of three couplings 116, 117, 118, one located between each pair of brackets 113, 114 and 115 respectively. A drive unit 119 is mounted on the main frame adjacent the brackets 114, and comprises a reversible electric motor 120 driving a gear-box 121, which is drivingly connected to the coupling 117.

Each shutter 27–31, is modified by removing the shaft 66 together with the associated roller assembly 26, and a right-angle bracket 125 is attached to the upper parts of the side plates 18 and 24. The bracket 125 has a downwardly facing flange 126 which is of concave section of similar radius to the head 127 of the hydraulic jack 106.

The above described moulding apparatus may be used in the following manner.

The shutters 27 to 31 are shown in the moulding position in FIG. 4, in which position the shutters are forced tightly together by means of hydraulic rams 44 and 47, hooked over their respective pins in the girders 12 and supporting members 100. The loose nut on each piston is rotated so that it abuts the body of the ram which prevents any release of pressure on the shutters should the hydraulic system leak or the hydraulic pressure be inadvertently released.

Concrete is then poured into the open tops of the moulds 37–41 and left to set. When the concrete has set solidly the hydraulic pressure on the rams is raised so that the nut of each piston may be released. The hydraulic pressure of the rams 44 and 47 is then released and the rams close by the action of tension springs. The rams are removed from their pins 45 and 46 on to a bracket on shutter 27.

The motor 120 of the drive unit 119 is then actuated to move the carriages 103 so that the hydraulic jacks of the carriages 103 are located beneath the brackets 125 of the shutters 27. The hand manual pump 108 is operated to raise the jacks 106 whereby the shutter is lifted clear of the main frame. The motor 120 is actuated again to move the carriages to the right (FIG. 4), carrying the shutter 27. At the extreme position of movement of the carriages 103 on the supporting members 100, the pressure is released from the jacks 106, lowering the shutter so that it rests on the main frame. A crane then lifts slightly the concrete panel which has been formed in the mould 37.

A gate (not shown) in one supporting member 100 is opened and the crane moves the concrete panel along to the gate, then moves the concrete panel out of the mould frame edgewise through the gap formed by the gate.

The gate is then closed and the operation repeated for each of the shutters in turn. When the last concrete panel has been removed from mould 41 the gate may be closed and the shutters moved to the left hand end of the mould frame (as shown in FIG. 4) to mould another five concrete panels.

It will be appreciated that the manually operated pumps 108 of each carriage may be replaced by a power operated pump, located either on the respective carriage, or remote from the carriage and connected thereto by means of flexible piping.

I claim:

1. Moulding apparatus comprising
   a. a frame having a base portion and an end wall upstanding from the base portion,
   b. a plurality of upstanding wall members parallel to the end wall and in face to face relationship therewith,
   c. two support members running along an upper part of the apparatus, one running along each side of the apparatus respectively, said wall members being positioned so that portions thereof rest on said support members and the lower edges thereof rest on said base portion,
   d. a soffit between each adjacent pair of wall members and fixed along the lower edge of one of said pair of wall members to define with the wall members a moulding cavity between the wall members when the wall members are in a moulding position with the lower edges of the wall members and the soffits supported on said base portion,
   e. at least two hydraulic ram devices, which in the moulding position, are mounted on the frame, one being arranged to act at or near the top and the other at or near the bottom of the wall member furthest from the end wall to urge the wall members and soffits together to form the moulding cavities, the hydraulic ram devices being readily disengageable from the frame to allow the wall members to be moved from the moulding position,
   f. a separate carriage mounted for movement along the length of each of said two support members,
   g. means on each carriage for selectively lifting a mould wall member from its position resting on said support members and said base portion, and
   h. power drive means for moving each carriage along its support member whereby a mould wall member can be moved towards or away from the moulding position, said power drive means including a chain associated with each support member which chains are linked by said carriages, each chain passing around sprockets located at or adjacent each end of the support member with which it is associated, and wherein the two sprockets at or adjacent at least one of the ends of the two support members respectively are interconnected by shafting, there being drive means arranged to rotate the shafting.

2. Moulding apparatus as claimed in claim 1 wherein the drive means is drivingly connected to the shafting to substantially the mid-point of the shafting between the sprockets.

3. Moulding apparatus as claimed in claim 1 wherein each of said support members comprises a pair of channel members connected together with the channels facing one another and the base webs disposed in a generally vertical plane.

4. Moulding apparatus as claimed in claim 3 wherein each carriage has a pair of rollers rotatably mounted thereon, each roller being shaped for engagement with the lowermost side flange of each of the two channel members of the associated supporting member.

5. Moulding apparatus as claimed in claim 1 wherein each of said lifting means comprises a hydraulic jack mounted on its respective carriage, the jack being engageable with a part of said wall members.

6. Moulding apparatus comprising
   a. a frame having a base portion and an end wall upstanding from the base portion,
   b. a plurality of upstanding wall members parallel to the end wall and in face to face relationship therewith, each wall member having a laterally protruding edge portion,
   c. at least a support member running along an upper part of the apparatus which member is perpendicular to the wall members and on which member portions of the wall members rest with their lower edges resting on the said base portion,
   d. a soffit between each adjacent pair of wall members and fixed along the lower edge of one of said pair of wall members to define with the wall members a moulding cavity between the wall members when the wall members are in a moulding position with the lower edges of the wall members and the soffits supported on said base portion,
   e. at least two hydraulic ram devices, which is the moulding position, are mounted on the frame, one being arranged to act at or near the top and the other at or near the bottom of the wall member furthest from the end wall to urge the wall members and soffits together to form the moulding cavities, the hydraulic ram devices being readily disengageable from the frame to allow the wall members to be moved from the moulding position,
   f. a single carriage being mounted for movement along the length of each support member,
   g. means on each carriage for lifting any selected one of said mould wall members from its position resting on said at least one support member and said base portion when said carriage is brought to a position adjacent said selected mould wall member, which means includes a vertically movable member for being raised to engage a laterally protruding edge portion of said selected mould wall member,
   h. power drive means for moving said carriage along said support member to said position adjacent a selected wall member and for moving said carriage along said support member after said selected wall member has been lifted to move said member towards or away from the moulding position.

* * * * *